(12) United States Patent
Deb

(10) Patent No.: US 9,577,260 B2
(45) Date of Patent: Feb. 21, 2017

(54) ULTRA-LIGHTWEIGHT ENERGY STORAGE MATERIAL

(71) Applicant: UNIVERSITY OF CALCUTTA, West Bengal (IN)

(72) Inventor: Nilanjan Deb, Kolkata (IN)

(73) Assignee: University of Calcutta, Kolkata, West Bengal, IN (US)

( * ) Notice: Subject to any disclaimer, the term of this patent is extended or adjusted under 35 U.S.C. 154(b) by 214 days.

(21) Appl. No.: 14/309,554

(22) Filed: Jun. 19, 2014

(65) Prior Publication Data

US 2014/0377662 A1 Dec. 25, 2014

(30) Foreign Application Priority Data

Jun. 20, 2013 (IN) .............................. 734/KOL/2013

(51) Int. Cl.
*H01M 4/58* (2010.01)
*C01B 35/04* (2006.01)

(52) U.S. Cl.
CPC ............... *H01M 4/58* (2013.01); *C01B 35/04* (2013.01); *C01P 2006/10* (2013.01)

(58) Field of Classification Search
CPC ............ H01M 4/58; H01M 4/36; H01M 4/02; H01M 4/00; C01B 35/04; C01B 35/02; C01B 35/023; C01P 2006/10
See application file for complete search history.

(56) References Cited

U.S. PATENT DOCUMENTS

| | | | | |
|---|---|---|---|---|
| 4,132,837 A | * | 1/1979 | Soffer | H01M 10/0567 252/62.2 |
| 4,459,189 A | * | 7/1984 | Vance | C25B 11/04 204/290.01 |
| 4,722,860 A | * | 2/1988 | Doljack | C04B 41/009 428/408 |

OTHER PUBLICATIONS

Nagelschmitz et al., Scandium Iridium Boride $Sc_3Ir_5B_2$ and the Quaternary Derivatives $Sc_2MIr_5B_2$ with M = Be, Al, Si, Ti, V, Cr, Mn, Fe, Co, Ni, Cu, Ga or Ge: Preparation, Crystal Structure, and Physical Properties, *Chem Mater.* (Sep. 24, 1998), 10:3189-3195.
A123 Systems Introduces Breakthrough Lithium Ion Battery Technology That Optimizes Performance in Extreme Temperatures, accessed at https://web.archive.org/web/20130115120230/http://ir.a123systems.com/releasedetail.cfm?ReleaseID=682278, dated Jun. 12, 2012, pp. 1-3.

(Continued)

*Primary Examiner* — Cynthia H Kelly
*Assistant Examiner* — Kiran Akhtar
(74) *Attorney, Agent, or Firm* — Pepper Hamilton LLP

(57) ABSTRACT

Disclosed are compositions containing a formula of $Li_xTi_yV_1B_z$ wherein x, y, and z are real numbers greater than zero. In certain embodiments, x is not greater than 7, and y is not greater than 6, or a combination thereof. The composition may be a microporous aerogel, a mesoporous aerogel, a crystalline structure, or a combination thereof. In certain embodiments, the composition may be an aerogel, and a surface of the aerogel comprises microcrystals, nanocrystals or a combination thereof. The compositions have very low densities. Also disclosed are methods to produce the composition and use of the composition in energy storage devices.

30 Claims, 5 Drawing Sheets

(56) References Cited

OTHER PUBLICATIONS

Amine et al., Nanostructured Anode Material for High-Power Battery System in Electric Vehicles, *Advanced Materials* (2010), 22:3052-3057.
Chan et al., Fast, Completely Reversible Li Insertion in Vanadium Pentoxide Nanoribbons, *Nano Letters* (Jan. 26, 2007), 7(2):490-495.
Choi et al., Study of the Electrochemical Properties of $Li_4Ti_5O_{12}$ Doped with Ba and Sr Anodes for Lithium-Ion Secondary Batteries, *Journal of the Korean Ceramic Society* (2010), 47(6):638-542.
Gao et al., Multi-electron reaction materials for high energy density batteries, *Energy and Environmental Science* (Feb. 2010), 3(2):165-240.
Huang, Electrochemical Impedance Analyses of Li Intercalation Processes into $Li_4Ti_5O_{12}$, Delft Interfaculty Research Center: Renewable Energy, p. 1 [downloaded from internet Jun. 18, 2014].
Islam, Simulation studies of lithium intercalation in transition metal oxides, *Philosophical Magazine A* (1993), 68(4):667-675.
Keller, Sulfur in hollow nanofibers overcomes challenges of lithium-ion battery design, Stanford Report (Oct. 4, 2011), pp. 1-3.
Ketterer, et al., Lithium-Ion Batteries: State of the Art and Application Potential in Hybrid-, Plug-In Hybrid- and Electric Vehicles, Institut für Materialforschung I Forschungszentrum Karlsruhe GmbH, Karlsruhe, Oct. 2009, pp. 1-118.
Kim et al., $Li^+$Storage Sites in Amorphous $V^2O^5$ Prepared by Precipitation Method, *Journal of the Electrochemical Society* (May 30, 2003), 150(7):A985-A989.
Kubiak et al., Phase transition in the spinel $Li_4Ti_5O_{12}$ induced by lithium insertion Influence of the substitutions Ti/V, Ti/Mn, Ti/Fe, *Journal of Power Sources* (2003), 119-121.
Licht et al., Recjargeab;e $Fe_{(III/VI)}$ super-iron cathodes, *Chem. Commun.* (Feb. 24, 2004), 628-629.
Licht et al., Energetic Iron (VI) Chemistry: The Super-Iron Battery, *Science* (Aug. 13, 1999), 285:1039-1042.
Licht et al., Renewable highest capacity $VB_2$/air energy storage, *Chem. Commun.* (Jun. 17, 2008), 3257-3259.
Licht et al., Cathodic chemistry of high performance Zr coated alkaline materials, *Chem. Commun.* (Sep. 5, 2006), 4341-4343.
Lithium-Air Battery With Large Capacity: Development of New-type Lithium-Air Battery with Large Capacity, Advanced Industrial Science and Technology (AIST), Jul. 27, 2009, pp. 1-6.
Lu et al., The Influence of Catalysts on Discharge and Charge Voltages of Rechargeable Li-Oxygen Batteries, *Electrochemical and Solid-State Letters* (Apr. 1, 2010), 13(6):A69-A72.
Oshima et al., Visualization of Lithium Atoms in $LiV_2O_4$ by a Spherical Aberration Corrected Electron Microscope, *Micros. Microanal.* (2010), 16(Suppl 2):, 162-163.
Park et al., Nitridation-Driven Conductive $Li_4Ti_5O_{12}$ for Lithium Ion Batteries, *J. Am. Chem. Soc.* (Oct. 15, 2008), 130:14930-14931.
Shen et al., In situ growth of $Li_4Ti_5O_{12}$ on multi-walled carbon nanotubes: novel coaxial nanocables from high rate lithium ion batteries, *J. Mater. Chem.* (2011), 21:761-767.
Wang et al., Electrochemical Characterization of $Li_4Ti_5O_{12}$/C Anode Material Prepared by Starch-Sol-Assisted Rheological Phase Method for Li-Ion Battery, *Journal of Nanomaterials* (2012), 2012:1-7.
Wang et al., Synthesis and electrochemical performance of nano-sized $Li_4Ti_5O_{12}$ with double surface modification of Ti(II) and carbon, *J. Mater. Chem.* (Jul. 24, 2009), 19:6789-6789.
Wang et al., Study of lithium diffusion through vanadium pentoxide aerogel, *Proc. of SPIE* (2008), 6984:69841:1 to 69841:4.
Zheng et al., Hollow Carbon Nanofiber-Encapsulated Sulfur Cathodes for High Specific Capacity Rechargeable Lithium Batteries, *Nano Letters* (Sep. 14, 2011), 11:4462-4467.

\* cited by examiner

ULTRA-LIGHTWEIGHT ENERGY STORAGE MATERIAL

CROSS-REFERENCE TO RELATED APPLICATION

This application claims priority benefit under Title 35 U.S.C. §119(a) of Indian Patent Application No. 734/KOL/2013, filed Jun. 20, 2013, the contents of which are herein incorporated by reference.

BACKGROUND

Ultra-lightweight high energy density electrodes with multi-electron reactions have created tremendous interest among scientists and stakeholders. Due to increasing consumer demand for light portable electronic devices, it may be desirable to replace widely used lithium-ion batteries and other heavy conventional batteries in portable electronics with batteries having ultra-light weight materials. Such ultra-lightweight materials may greatly improve the portability of electronic devices, and may usefully have high battery efficiency, increased energy capacity, and device lifetime, reduced recharge time, and toxicity level and less impact to the environment.

SUMMARY

In a first embodiment, the present application describes a composition comprising a material having a formula of $Li_xTi_yV1B_z$, wherein x, y, and z are real numbers greater than 0. In another embodiment compositions exist, wherein x is not greater than 7. In another embodiment compositions exist, wherein y is not greater than 6. In another embodiment compositions exist, wherein z is not greater than 5. In another embodiment compositions exist, wherein z is equal to or greater than 5. In another embodiment compositions exist, wherein z is less than or equal to 10. In another embodiment compositions exist, wherein z is not greater than 2. In another embodiment compositions exist, wherein z is less than or equal to 2. In another embodiment compositions exist, wherein the composition is a microporous aerogel, a mesoporous aerogel, a crystalline structure, or a combination thereof. In another embodiment compositions exist, wherein the composition is an aerogel selected from a microporous aerogel, a mesoporous aerogel, and a combination thereof, and a surface of the aerogel comprises microcrystals, nanocrystals, or a combination thereof, of the material. In another embodiment compositions exist, wherein the composition is a film. In another embodiment compositions exist, wherein the composition is spongy. In another embodiment compositions exist, wherein the composition has a density of about 0.05 gram/mL to about 1 gram/mL on a dried basis. In another embodiment compositions exist, wherein the composition has a density of 0.05 gram/mL to about 0.3 gram/mL on a dried basis. In another embodiment compositions exist, wherein the composition has a density of 0.10 gram/mL to about 0.15 gram/mL on a dried basis. In another embodiment compositions exist, wherein one or more of Li, Ti, V, and B, is in an oxidized state.

In a second embodiment, the present application describes a method of producing a composition comprising a formula of $Li_xTi_yV1B_z$, wherein x, y, and z are real numbers greater than 0, the method comprising: contacting an aqueous solution of a vanadium entity, a titanium entity, and a lithium entity, with a borohydride to form an aqueous mixture of nanoparticles; standing the aqueous mixture of nanoparticles for a time to form a gel; isolating the gel; and drying the gel to form the composition. In another embodiment methods exist, wherein the vanadium entity comprises a vanadium alcoholate, a vanadium halide, a vanadium oxide, or combination thereof. In another embodiment methods exist, wherein the vanadium entity comprises vanadium isopropoxide, vanadium tetrachloride, vanadium pentoxide, or a combination thereof. In another embodiment methods exist, wherein the vanadium entity comprises vanadium isopropoxide. In another embodiment methods exist when contacting a vanadium oxide with concentrated hydrochloric acid to form a vanadium chloride; and adding a first alkyl alcohol to the vanadium chloride to form the vanadium entity. In another embodiment methods exist, wherein the first alkyl alcohol is an isopropyl alcohol. In another embodiment methods exist, wherein the first alkyl alcohol is methanol, ethanol, isopropanol, n-propanol, a butanol, or a combination thereof. In another embodiment methods exist, wherein the titanium entity comprises a titanium alcoholate, titanium halide, a titanium oxide, or a combination thereof. In another embodiment methods exist, wherein the titanium entity comprises titanium isopropoxide, titanium chloride, titanium oxide, or a combination thereof. In another embodiment methods exist, wherein the titanium entity comprises titanium isopropoxide. In another embodiment methods exist when contacting a titanium oxide with concentrated hydrochloric acid to form a titanium chloride; and adding a second alkyl alcohol to the titanium chloride to form the titanium entity. In another embodiment methods exist, wherein the second alkyl alcohol is an isopropyl alcohol. In another embodiment methods exist, wherein the second alkyl alcohol is methanol, ethanol, isopropanol, n-propanol, a butanol, or a combination thereof. In another embodiment methods exist, wherein the lithium entity comprises a lithium alcoholate, lithium halide, lithium hydroxide, or combination thereof. In another embodiment methods exist, wherein the lithium entity comprises lithium isopropoxide, lithium chloride, lithium hydroxide or a combination thereof. In another embodiment methods exist, wherein the lithium entity comprises lithium isopropoxide. In another embodiment methods exist when contacting lithium hydroxide with concentrated hydrochloric acid to form a lithium chloride; and adding a third alkyl alcohol to the lithium chloride to form the lithium entity. In another embodiment methods exist, wherein the third alkyl alcohol is methanol, ethanol, isopropanol, n-propanol, a butanol, or a combination thereof. In another embodiment methods exist, wherein the third alkyl alcohol is an isopropyl alcohol. In another embodiment methods exist, wherein the aqueous solution has the lithium entity in molar excess over the vanadium entity. In another embodiment methods exist, wherein the aqueous solution has the titanium entity in molar excess over the vanadium entity. In another embodiment methods exist, wherein the aqueous solution has a molar excess of the sum of the lithium entity and the titanium entity over the vanadium entity. In another embodiment methods exist, wherein the borohydride is sodium borohydride. In another embodiment methods exist, wherein the borohydride is lithium borohydride. In another embodiment methods exist, wherein the aqueous solution further comprises methanol, n-propanol, isopropanol, a butanol, acetone, or a combination thereof. In another embodiment methods exist, wherein drying the gel comprises subcritical drying. In another embodiment methods exist, wherein drying the gel comprises supercritical drying. In another embodiment methods exist when contacting lithium hydroxide with an excess of hydrochloric acid to form a lithium chloride, and adding a first alcohol to the lithium chloride to form the lithium entity; and contacting titanium dioxide with an excess of hydrochloric acid to form a titanium chloride, and adding a second alcohol to the titanium chloride to form the titanium entity; contacting vanadium pentoxide with an excess of hydrochloric acid to form a vanadium tetrachloride, and adding a third alcohol to the vanadium tetrachloride to form the vanadium entity; mixing the lithium entity, the titanium entity, and the vanadium entity to form the aqueous solution. In another embodiment methods exist, wherein the first alcohol, second alcohol, and third alcohol are each an isopropyl alcohol. In another embodiment methods exist, wherein the first alcohol, second alcohol, and third alcohol are independently selected from methanol, ethanol, n-propanol, isopropanol, a butanol, or a combination thereof.

A third embodiment of the present application describes a battery, comprising: a first half cell comprising an anode in contact with an anolyte, wherein the anode comprises a layer in contact with the anolyte, the layer comprising a formula of $Li_xTi_yV_1B_z$, wherein x, y, and z are real numbers greater than 0; a second half cell comprising a cathode in contact with a catholyte; wherein the first half cell is in electrochemical contact with the second half cell, the first half cell separated from the second half cell by a separator. In another embodiment batteries of the third embodiment exist, wherein the layer is a mesoporous aerogel, a microporous aerogel, or a combination thereof. In another embodiment batteries of the third embodiment exist, wherein x is greater than 0 and not greater than 7. In another embodiment batteries of the third embodiment exist, wherein y is greater than 0 and not greater than 6. In another embodiment batteries of the third embodiment exist, wherein z is greater than 0 and not greater than 5. In another embodiment batteries of the third embodiment exist, wherein the anolyte is a solid or a fluid. In another embodiment batteries of the third embodiment exist, wherein the layer is substantially a mesoporous aerogel. In another embodiment batteries of the third embodiment exist, wherein the battery provides a continuous open circuit discharge of about 1.3 V to about 1.6V.

DETAILED DESCRIPTION

Figure 1:
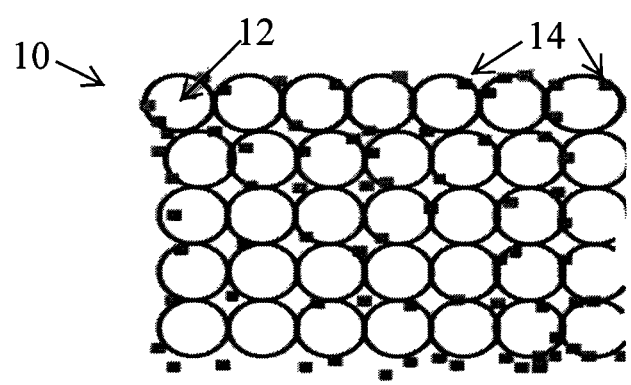
FIG. 1: Schematic diagram $Li_xTi_yV_1B_z$ crystals dispersed in an aerogel in accordance with the disclosed embodiments.

Embodiments disclosed herein relate to compositions that include materials with a reduced species formula of $Li_xTi_yV_1B_z$, wherein x, y, and z are real numbers greater than zero, methods of making the compositions, and energy storage devices such as batteries made from the compositions.

As used herein, "real numbers" shall include all of the measuring numbers, both integers and fractions. Real numbers correspond to a point on the number line and are usually written using decimal numerals. Integers are the subset of real numbers that can be written without a fractional or decimal component.

As used herein, "aerogel" refers to a highly porous, often extremely lightweight solid. Aerogels are characterized by a plurality of small internal voids. Voids on the surface of the aerogel form pores. Pores and voids allow passage of a fluid (for example, gas- or liquid-phase molecules) through the material.

As used herein, "mesoporous" refers to a porous material having a network of interconnecting pores and voids, wherein the pores and voids have a volume average diameter ranging from about 2 to 50 nm, about 2 to 100 nm, or about 2 to 200 nm.

As used herein, "microporous" refers to a porous material having a network of interconnecting pores, wherein the pores and voids have a volume average diameter ranging from less than about 2 nm, less than about 1 nm, or about 0.2 nm to about 2 nm.

Calculation of a reduced species formula of lithium titanium vanadium boride compound may be as follows. The general reduced species formula is denoted herein as "$Li_xTi_yV_1B_z$" (or "$Li_xTi_yVB_z$"). The weight percentages of lithium, titanium, vanadium, and boron may be determined by elemental analysis. Using the weight percentages and the molecular weights of lithium, titanium, vanadium and boron, the values of x, y and z may be determined to arrive at the reduced species formula. The values x, y and z may be derived as follows.

Lithium: $x$=(weight % Li)(50.94 grams V/mol V)/(6.94 grams Li/mol Li)(weight % V);

Titanium: $y$=(weight % Ti)(50.94 grams V/mol V)/(47.87 grams Ti/mol Ti)(weight % V);

Vanadium=1;

Boron: $z$=(weight % B)(50.94 grams V/mol V)/(10.81 grams B/mol B)(weight % V).

For example, a sample having 2.23 weight % lithium, 35.15 weight % titanium, 10 weight % vanadium and 0.86 weight % boron, as determined by elemental analysis, will have the calculated reduced species formula $Li_{1.64}Ti_{3.74}V_1B_{2.48}$, with x, y, and z having real number values of 1.64, 3.74, and 2.48 respectively. The same compound may be represented as having the formula $Li_2Ti_4V_1B_2$, with x, y, and z rounded to the nearest integer.

Disclosed is a composition having the ability to store energy. The composition may include a material with a reduced species molecular formula of $Li_xTi_yV_1B_z$, wherein x, y, and z are real numbers greater than zero. One use of the material can be in batteries, thus the material can be subjected to reduction and oxidation during charging and discharging processes. As such, in some embodiments, the four elements Li, Ti, V and B, may be fully reduced, fully oxidized, or may have a mixture of various oxidation states including fully reduced, fully oxidized, a combination of reduced and oxidized, and/or partially oxidized elements. The boron may exist in oxidation states of 0 and 3. In certain embodiments, the boron may exist as B, $B_2O_3$, other oxidized boron species, or a combination thereof. The titanium may exist in oxidation states 0, 3, and 4. In other embodiments, the titanium may exist as Ti, $TiO_2$, an intermediate oxidized titanium, or a combination thereof. The vanadium may exist in oxidation states of 0, 2, 3, 4, and 5. In various embodiments, the vanadium may exist as V, $V_2O_5$, an intermediate oxidized vanadium, or combinations thereof. Lithium may exist in oxidation states of 0 and 1. In some embodiments, the lithium may neutral lithium, Li cation, or a combination thereof.

In some embodiments, x may not be greater than 7. In various other embodiments, x may not be greater than about 6, about 5, about 4, about 3, about 2, about 1, or any real number value between any of the stated integers.

In some embodiments, y may not be greater than 6. In various other embodiments, y may not be greater than about 5, about 4, about 3, about 2, about 1, or any real number value between any of the stated integers.

In some embodiments, z may not be greater than 5. In an embodiment, z may not be greater than 2. In an embodiment, z may be less than or equal to 2. In various other embodiments, z may not be greater than about 4, about 3, about 2, about 1, or any real number value between any of the stated integers. In some embodiments, z may be equal to or greater than about 5. In various other embodiments, z may be equal to or greater than about 6, may be equal to or greater than about 7, may be equal to or greater than about 8, may be equal to or greater than about 9, or about 10 or any real number value between any of the stated integers. In an embodiment, z may be equal to or greater than about 5 to equal to or less than about 10.

The values of x, y, and z are real numbers greater than zero. When rounding the values of x, y, and z to the nearest integers, the composition of the disclosed embodiments may include $Li_xTi_yV_1B_z$ having the following reduced species molecular formulas as shown in Table 1:

TABLE 1

| No. | Embodiments: |
|---|---|
| 1 | When x rounds to 0, y may round to any integer 0-6, and z may round to any integer 0-5. |
| 2 | When x rounds to 1, y may round to any integer 0-6, and z may round to any integer 0-5. |
| 3 | When x rounds to 2, y may round to any integer 0-6, and z may round to any integer 0-5. |
| 4 | When x rounds to 3, y may round to any integer 0-6, and z may round to any integer 0-5. |
| 5 | When x rounds to 4, y may round to any integer 0-6, and z may round to any integer 0-5. |
| 6 | When x rounds to 5, y may round to any integer 0-6, and z may round to any integer 0-5. |
| 7 | When x rounds to 6, y may round to any integer 0-6, and z may round to any integer 0-5. |
| 8 | When x rounds to 7, y may round to any integer 0-6, and z may round to any integer 0-5. |
| 9 | When y rounds to 0, x may round to any integer 0-7, and z may round to any integer 0-5. |
| 10 | When y rounds to 1, x may round to any integer 0-7, and z may round to any integer 0-5. |
| 11 | When y rounds to 2, x may round to any integer 0-7, and z may round to any integer 0-5. |
| 12 | When y rounds to 3, x may round to any integer 0-7, and z may round to any integer 0-5. |
| 13 | When y rounds to 4, x may round to any integer 0-7, and z may round to any integer 0-5. |
| 14 | When y rounds to 5, x may round to any integer 0-7, and z may round to any integer 0-5. |
| 15 | When z rounds to 0, x may round to any integer 0-7, and y may round to any integer 0-6. |
| 16 | When z rounds to 1, x may round to any integer 0-7, and y may round to any integer 0-6. |
| 17 | When z rounds to 2, x may round to any integer 0-7, and y may round to any integer 0-6. |
| 18 | When z rounds to 3, x may round to any integer 0-7, and y may round to any integer 0-6. |
| 19 | When z rounds to 4, x may round to any integer 0-7, and y may round to any integer 0-6. |
| 20 | When z rounds to 5, x may round to any integer 0-7, and y may round to any integer 0-6. |
| 21 | When z rounds to 6, x may round to any integer 0-7, and y may round to any integer 0-6. |
| 22 | When x rounds to any integer 0-7, y may round to any integer 0-6, and z may round to any integer 0-5. |
| 23 | When x rounds to any integer 0-7, y may round to any integer 1-6, and z may round to any integer 1-5. |
| 24 | When x rounds to any integer 1-7, y may round to any integer 0-6, and z may round to any integer 1-5. |
| 25 | When x rounds to any integer 1-7, y may round to any integer 1-6, and z may round to any integer 0-5. |
| 26 | When x rounds to any integer 0-7, y may round to any integer 0-6, and z may round to any integer 1-5. |
| 27 | When x rounds to any integer 0-7, y may round to any integer 1-6, and z may round to any integer 0-5. |
| 28 | When x rounds to any integer 1-7, y may round to any integer 0-6, and z may round to any integer 0-5. |

TABLE 1-continued

| No. | Embodiments: |
|---|---|
| 29 | When x rounds to any integer 1-7, y may round to any integer 1-6, and z may round to any integer 1-5. |
| 30 | When x rounds to 0, y may round to any integer 0-6, and z may round to any integer 5-10. |
| 31 | When x rounds to 1, y may round to any integer 0-6, and z may round to any integer 5-10. |
| 32 | When x rounds to 2, y may round to any integer 0-6, and z may round to any integer 5-10. |
| 33 | When x rounds to 3, y may round to any integer 0-6, and z may round to any integer 5-10. |
| 34 | When x rounds to 4, y may round to any integer 0-6, and z may round to any integer 5-10. |
| 35 | When x rounds to 5, y may round to any integer 0-6, and z may round to any integer 5-10. |
| 36 | When x rounds to 6, y may round to any integer 0-6, and z may round to any integer 5-10. |
| 37 | When x rounds to 7, y may round to any integer 0-6, and z may round to any integer 5-10. |
| 38 | When y rounds to 0, x may round to any integer 0-7, and z may round to any integer 5-10. |
| 39 | When y rounds to 1, x may round to any integer 0-7, and z may round to any integer 5-10. |
| 40 | When y rounds to 2, x may round to any integer 0-7, and z may round to any integer 5-10. |
| 41 | When y rounds to 3, x may round to any integer 0-7, and z may round to any integer 5-10. |
| 42 | When y rounds to 4, x may round to any integer 0-7, and z may round to any integer 5-10. |
| 43 | When y rounds to 5, x may round to any integer 0-7, and z may round to any integer 5-10. |
| 44 | When z rounds to 6, x may round to any integer 0-7, and y may round to any integer 0-6. |
| 45 | When z rounds to 7, x may round to any integer 0-7, and y may round to any integer 0-6. |
| 46 | When z rounds to 8, x may round to any integer 0-7, and y may round to any integer 0-6. |
| 47 | When z rounds to 9, x may round to any integer 0-7, and y may round to any integer 0-6. |
| 48 | When z rounds to 10, x may round to any integer 0-7, and y may round to any integer 0-6. |
| 49 | When x rounds to any integer 0-7, y may round to any integer 0-6, and z may round to any integer 5-10. |
| 50 | When x rounds to any integer 0-7, y may round to any integer 1-6, and z may round to any integer 5-10. |
| 51 | When x rounds to any integer 1-7, y may round to any integer 0-6, and z may round to any integer 5-10. |
| 52 | When x rounds to any integer 1-7, y may round to any integer 1-6, and z may round to any integer 5-10. |
| 53 | When x rounds to any integer 0-7, y may round to any integer 0-6, and z may round to any integer 5-10. |
| 54 | When x rounds to any integer 0-7, y may round to any integer 1-6, and z may round to any integer 5-10. |
| 55 | When x rounds to any integer 1-7, y may round to any integer 0-6, and z may round to any integer 5-10. |
| 56 | When x rounds to any integer 1-7, y may round to any integer 1-6, and z may round to any integer 5-10. |

The composition may be an aerogel solid, a crystalline solid, or a solid including both aerogel and crystalline domains. The composition may also be a spongy solid. The aerogel may be a three-dimensional network of a continuous microporous or mesoporous volume with $Li_xTi_yV_1B_z$ crystal particles. The $Li_xTi_yV_1B_z$ crystal particles may be on a surface of the aerogel, embedded in the aerogel, or a combination thereof. The $Li_xTi_yV_1B_z$ crystal particles may be dispersed around pore spaces in the aerogel. The $Li_xTi_yV_1B_z$ crystals may be nanocrystals, microcrystals, or a combination thereof.

In specific embodiments, the ratio of lithium:titanium:vanadium:boron, rounded to the nearest integers, are $Li_4Ti_4VB_4$, $Li_2Ti_8VB_4$, $Li_2Ti_4V_2B_4$, $Li_2Ti_4V_1B_2$; $Li_2Ti_3V_1B_2$; $Li_2Ti_2V_1B_2$; $Li_1Ti_2V_1B_2$; $Li_2Ti_1V_1B_2$; or $Li_1Ti_1V_1B_2$.

In some embodiments, the $Li_xTi_yV_1B_z$ may have a low density. The compound vanadium boride may have a density, on a dried basis, of about 5.1 gram/mL. In certain embodiments, the $Li_xTi_yV_1B_z$ may have a density that approximates that of vanadium boride and may be less than about 5 gram/mL. In an embodiment, the $Li_xTi_yV_1B_z$ may have a density of about 0.1 gram/mL on a dried basis. In some embodiments, the $Li_xTi_yV_1B_z$ may have a density of about 0.05 gram/mL to about 1 gram/mL, about 0.05 gram/mL to about 0.3 gram/mL, about 0.05 gram/mL to about 0.2 gram/mL or about 0.10 gram/mL to about 0.15 gram/mL, on a dried basis. In various embodiments, the $Li_xTi_yV_1B_z$ may have a density, on a dried basis, of less than about 2 gram/mL; less than about 1 gram/mL; less than about 0.9 gram/mL; less than about 0.8 gram/mL; less than about 0.7 gram/mL; less than about 0.6 gram/mL; less than about 0.5 gram/mL; less than about 0.4 gram/mL; less than about 0.3 gram/mL; less than about 0.2 gram/mL; less than about 0.15 gram/mL; about 0.1 gram/mL; less than about 0.1 gram/mL, or any concentration between any of the stated values.

Also disclosed is a method of producing a composition that includes a formula of $Li_xTi_yV_1B_z$, wherein x, y and z are real numbers greater than zero. The method may include contacting an aqueous solution of a vanadium entity, a titanium entity, and a lithium entity, with a borohydride to form an aqueous mixture of nanoparticles including vanadium, titanium, lithium and a borate; standing the aqueous mixture of nanoparticles for a period of time to form a gel; isolating the gel; and drying the gel. The gel may be an aerogel, crystalline, or a combination thereof, as described in the disclosed embodiments.

In some embodiments, the vanadium entity may include vanadium isopropoxide. In some embodiments, the vanadium entity need not be pure. For example, the vanadium entity may include vanadium pentoxide and vanadium tetrachloride in addition to the vanadium isopropoxide. The vanadium entity may include a vanadium alcoholate such as vanadium isopropoxide, a vanadium halide such as vanadium chloride, a vanadium oxide such as vanadium pentoxide, or combination thereof. In certain embodiments, the vanadium entity may be prepared by contacting a vanadium chloride such as vanadium tetrachloride with an alkyl alcohol such as isopropyl alcohol. The vanadium chloride may prepared by contacting a vanadium oxide such as vanadium pentoxide with concentrated hydrochloric acid. In some embodiments, the vanadium entity may be produced by contacting a vanadium oxide with concentrated hydrochloric acid to form a vanadium chloride; and adding an alkyl alcohol to the vanadium chloride to form the vanadium entity. In some embodiments, vanadium pentoxide may be mixed with an excess of hydrochloric acid and with a first alkyl alcohol to form the vanadium entity. The supernatant from mixing vanadium pentoxide in an excess of hydrochloric acid may be decanted and mixed with the first alkyl alcohol to form the vanadium entity. In some embodiments, the first alkyl alcohol may be isopropyl alcohol. In some embodiments, the first alkyl alcohol may be methanol, ethanol, isopropanol, n-propanol, a butanol, or a combination thereof.

In some embodiments, the vanadium entity may include a vanadium alcoholate such as vanadium methoxide, vanadium ethoxide, vanadium propoxide, vanadium butoxide, isomers thereof, or a combination thereof. The vanadium alcoholates may be prepared as above by contacting a vanadium chloride with an alkyl alcohol such as methanol, ethanol, isopropanol, n-propanol, a butanol, or a combination thereof.

In some embodiments, the titanium entity may include titanium isopropoxide. In some embodiments, the titanium entity need not be pure. For example, the titanium entity may include titanium dioxide and titanium tetrachloride in addition to the titanium isopropoxide. The titanium entity may include a titanium alcoholate such as titanium isopropoxide, a titanium halide such as titanium tetrachloride, a titanium oxide such as titanium dioxide, or combination thereof. In certain embodiments, the titanium entity may be prepared by contacting a titanium chloride such as titanium tetrachloride with an alkyl alcohol such as isopropyl alcohol. The titanium chloride may be prepared by contacting a titanium oxide such as titanium dioxide with concentrated hydrochloric acid. In some embodiments, the titanium entity may be produced by contacting titanium oxide with hydrochloric acid; and adding an alkyl alcohol to the titanium chloride solution to form the solution of the titanium entity. In some embodiments, titanium dioxide may be mixed with an excess of hydrochloric acid and with a second alkyl alcohol to form the titanium entity. The supernatant from mixing titanium dioxide in an excess of hydrochloric acid may be decanted and mixed with the second alkyl alcohol to form the titanium entity. In some embodiments, the second alkyl alcohol may be isopropyl alcohol. In some embodiments, the second alkyl alcohol may be methanol, ethanol, isopropanol, n-propanol, a butanol, or a combination thereof.

In some embodiments, the titanium entity may include a titanium alcoholate such as titanium methoxide, titanium ethoxide, titanium propoxide, titanium butoxide, isomers thereof, or a combination thereof. The titanium alcoholates may be prepared as above by contacting titanium chloride with an alkyl alcohol such as methanol, ethanol, isopropanol, n-propanol, a butanol, or a combination thereof.

In some embodiments, the lithium entity may include lithium isopropoxide. In an embodiment, the lithium entity need not be pure. For example, the lithium entity may include lithium hydroxide, lithium chloride, or both, in addition to the lithium isopropoxide. The lithium entity may include a lithium alcoholate such as lithium isopropoxide, a lithium halide such as lithium chloride, a lithium oxide such as lithium hydroxide, or combination thereof. In certain embodiments, the lithium entity may be prepared by contacting lithium chloride with an alkyl alcohol such as an isopropyl alcohol. The lithium chloride may be prepared by contacting lithium hydroxide with concentrated hydrochloric acid. In some embodiments, the lithium entity may be produced by contacting lithium hydroxide with concentrated hydrochloric acid to form a lithium chloride; and adding an alkyl alcohol to the lithium chloride to form the lithium entity. In some embodiments, lithium hydroxide may be mixed with an excess of hydrochloric acid and with a third alkyl alcohol to form the lithium entity. The supernatant from mixing lithium hydroxide in an excess of hydrochloric acid may be decanted and mixed with the third alkyl alcohol to form the titanium entity. In some embodiments, the third alkyl alcohol may be isopropyl alcohol. In some embodiments, the third alkyl alcohol may be methanol, ethanol, isopropanol, n-propanol, a butanol, or a combination thereof. The first, second and third alkyl alcohol may be the same or may be different.

In some embodiments, the lithium entity may include a lithium alcoholate such as lithium methoxide, lithium ethoxide, lithium propoxide, lithium butoxide and isomers thereof. The lithium alcoholates may be prepared as above by contacting lithium chloride with an alkyl alcohol such as methanol, ethanol, isopropanol, n-propanol, a butanol, or a combination thereof.

The lithium entity, titanium entity, and vanadium entity may be prepared separately. The lithium entity may be prepared in the same solution as the titanium entity or the vanadium entity. The titanium entity may be prepared in the same solution as the vanadium entity. The lithium entity, titanium entity, and the vanadium entity may be prepared together in one solution.

In some embodiments the borohydride may be sodium borohydride, lithium borohydride, potassium borohydride, or a combination of alkali borohydrides. In other embodiments the borohydride may be lithium borohydride. In other embodiments the borohydride may be sodium borohydride. In some embodiments, the borohydride can be in a molar excess when contacting with the aqueous solution of vanadium entity, titanium entity, and lithium entity.

Various combinations of lithium titanium vanadium boride have been prepared. More of the lithium, titanium, and vanadium entities require higher quantities of sodium borohydride for initial reduction to form aerogels. When sodium borohydride is further added after initial reduction, the proportion of crystalline material may increase. Completion of the first reduction of the lithium, titanium, and vanadium entities may be accompanied by a color change, such as a turn from a whitish green to a yellow/deep yellow/grey/grayish white.

In some embodiments, the drying of the gel can be by subcritical means, for example drying by converting volatile liquids present in the gel or provided to the gel, for example by washing the gel with volatile solvents, to gases. In some embodiments, the subcritical drying may be freeze-drying. In some embodiments, the subcritical drying may be by use of hot air. In certain embodiments, the subcritical drying is preceded by an acetone wash to remove water from the gel. In other embodiments, the sub-critical drying can be preceded by washing with a non-polar volatile solvent, including but are not limited to pentane, hexane, toluene, or combinations thereof.

In other embodiments, the drying can be by supercritical means. Supercritical drying is a process to remove liquid from the gel in a precise and controlled way. Supercritical drying may occur when liquid in the gel changes to a gas phase without crossing the liquid-gas phase boundary, but instead passes through a supercritical region, where there is no phase boundary between the two phases. Accordingly, the distinction between gas and liquid phases ceases to apply under supercritical conditions. Densities of the liquid phase and the vapor phase become equal at critical point of drying. Non-limiting fluids and representative conditions suitable for supercritical drying include carbon dioxide (critical point 304.25° K. at 7.39 MPa or 31.1° C. at 1072 psi) and freon (≈300° K. at 3.5-4 MPa or 25-0° C. at 500-600 psi). In certain embodiments, the mixture or solution of the $Li_xTi_yV_1B_z$ in high pressure liquid carbon dioxide may be heated until its temperature goes beyond the critical point, and the pressure may then be gradually released, allowing the gas to escape and leaving behind a dried product. In some embodiments, the supercritical drying may be preceded by an acetone wash to remove water since acetone is miscible with water and may then be removed by the high pressure liquid carbon dioxide. In other embodiments, the supercritical drying can be preceded by washing with a non-polar volatile solvent, including but are not limited to pentane, hexane, toluene, or combinations thereof.

Further disclosed is a battery using a formula ratio of $Li_xTi_yV_1B_z$, wherein x, y, and z are real numbers greater than zero. The battery may include an anode and a cathode in electrochemical contact with each other through an electrically neutral ionic conductor (an electrolyte). The cathode may include a catalyst effective for the reduction of dissolved oxygen. An electrical discharge of the anode may be performed via multiple electron oxidation of vanadium boride.

In an embodiment the battery may include: a first half cell including an anode in contact with an anolyte, wherein the anode includes a layer of material having a reduced species molecular formula of $Li_xTi_yV_1B_z$ in contact with the electrolyte, wherein x, y, and z are real numbers greater than zero; a second half cell including a cathode in contact with a catholyte; wherein the first half cell is in electrochemical contact with the second half cell, the first half cell separated from the second half cell by a separator.

In some embodiments, the material may be a film layer on the anode in contact with the anolyte. In some embodiments, the material may be an aerogel layer on the anode. In certain embodiments, the $Li_xTi_yV_1B_z$ material may be an aerogel solid, a crystalline solid, or a solid including both aerogel and crystalline domains. The $Li_xTi_yV_1B_z$ material may also be a spongy solid. The aerogel may be a three-dimensional network of a continuous microporous and/or mesoporous volume with $Li_xTi_yV_1B_z$ crystal particles. The $Li_xTi_yV_1B_z$ crystal particles may be on the surface of the aerogel, embedded in the aerogel, or combinations thereof. The $Li_xTi_yV_1B_z$ crystal particles may be dispersed around the pore spaces in the aerogel. The $Li_xTi_yV_1B_z$ crystals may be nanocrystals, microcrystals, or a combination thereof.

In some embodiments, the four elements Li, Ti, V and B may be fully reduced, fully oxidized, or may have a mixture of various oxidation states including fully reduced, fully oxidized, a mix of reduced and oxidized, and partially oxidized elements. The boron may exist in oxidation states of 0 and 3. In certain embodiments, the boron may exist as boron, $B_2O_3$, other oxidized boron species, or a combination thereof. The titanium may exist in oxidation states 0, 3, and 4. In other embodiments, the titanium may exist as Ti, $TiO_2$, an intermediate oxidized titanium, or a combination thereof. The vanadium may exist in oxidation states of 0, 2, 3, 4, and 5. In various embodiments, the vanadium may exist as V, $V_2O_5$, an intermediate oxidized vanadium, or a combination thereof. Lithium may exist in oxidation states of 0 and 1. In some embodiments, the lithium may exist as neutral lithium, Li cation, or a combination thereof.

In some embodiments, x may not be greater than 7. In various other embodiments, x may not be greater than about 6, about 5, about 4, about 3, about 2, about 1, or any real number value between any of the stated integers.

In some embodiments, y may not be greater than 6. In various other embodiments, y may not be greater than about 5, about 4, about 3, about 2, about 1, or any real number value between any of the stated integers.

In some embodiments, z may not be greater than 5. In some embodiments, z may not be greater than 2. In some embodiments, z may be less than or equal to 2. In various other embodiments, z may be less than or equal to about 4, about 3, about 2, about 1, or any real number value between any of the stated integers. In some embodiments, z may be equal to or greater than 5. In some embodiments, z may be equal to or greater than 5 to equal to or less than 10.

The anode may be in electrochemical contact with the cathode through an electrolyte to form a battery. A battery includes two half cells which are in electrochemical contact with each other through an electrolyte. The first half-cell may include an anode and the second half-cell may include a cathode. An electrical discharge of the anode may be performed via multiple electron oxidation of vanadium boride. The electrolyte may be an aqueous solution including a high concentration of hydroxide such as potassium hydroxide or any other suitable ionic conductor material. In other embodiments, the electrolyte may be sulfuric acid. In certain embodiments, the battery may provide a continuous open circuit discharge of about 1.3 V to about 1.6 V. Lithium titanium vanadium boride may include a three-dimensional network of a continuous microporous and mesoporous volume embedded with $Li_xTi_yV_1B_z$ crystal particles.

The crystal particles may be microcrystals, nanocrystals, or a combination thereof. Low surface tension solvents like acetone can be used to obtain aerogels having a high porosity, and high surface area. The gel can also be chemically modified to replace its polar surface groups with non-polar groups by diffusing a solution of aprotic solvent or waterproofing agent into its pores. For example, the pore fluid in the aerogel may be exchanged with aprotic solvents such as pentane, hexane, or toluene which are generally low-surface-tension solvents. Thereafter, the solvent in the lithium titanium vanadium boride aerogel may be gently evaporated. The solvent exchange process, which replaces pore fluids in the aerogel with low surface tension solvents, can reduce or prevent the collapse of the aerogel during the drying process.

The characteristic meso or micro porosity of these materials provides accessibility of the electrolyte to the pores of the aerogel, and rapid mass transport of the electrolyte via diffusion through the aerogel structure. $Li_xTi_yV_1B_z$ aerogel synthesis under ambient temperature and pressure may be primarily governed by parameters such as molarity and proportion of precursor constituents, molarity of the reducing agent, and alcohol:water ratio in the reaction mixture. These parameters may vary the values of x, y and z in the $Li_xTi_yV_1B_z$, but z may determine if the resulting material is more of an aerogel structure or a crystalline structure (macro-pore structure). As disclosed herein, a higher boron content, for example z greater than or equal to 5 may lead to a material that is more crystalline. In contrast, a lower boron content, for example z less than 5, may lead to a material that is an aerogel structure.

Without wishing to be bound by theory, possible chemical reactions involved in the process of $Li_xTi_yV_1B_z$ synthesis may include:

$TiO_2+4HCl \rightarrow TiCl_4+2H_2O$ - - - solution 1  I.

$TiCl_4+4iPrOH \rightarrow Ti(OiPr)_4+4HCl$ - - - (precursor solution 1)  II.

$V_2O_5+10HCl \rightarrow 2VCl_4+Cl_2+5H_2O$ - - - solution 2  III.

$VCl_4+4iPrOH \rightarrow VO(OiPr)_3+HCl$ - - - (precursor solution 2)  IV.

$LiOH\ H_2O+HCl \rightarrow LiCl+H_2O$ - - - solution 3  V.

$LiCl+iPrOH \rightarrow Li(OiPr)+HCl$ - - - (precursor solution 3)  VI.

$TiO_2+Ti(OiPr)_4+HCl+NaBH_4 \rightarrow Ti$ nanoparticles+ $H_3BO_3+NaCl$  VII.

$VO(OiPr)_3+HCl+NaBH_4 \rightarrow V$ nanoparticles+$H_3BO_3$+ NaCl  VIII.

$Li(OiPr)+HCl+NaBH_4 \rightarrow Li$ nanoparticles+$H_3BO_3$+ NaCl  IX.

Li nanoparticles+Ti nanoparticles+V nanoparticles+ $H_3BO_3$+reduction$\rightarrow Li_xTi_yV_1B_z$  X.

Drying of $Li_xTi_yV_1B_z$ gel may include subcritical or supercritical drying methods. For example, acetone washed semisolid $Li_xTi_yV_1B_z$ gel may be subjected to subcritical drying in a hot air oven without high pressures. Ultra-light weight $Li_xTi_yV_1B_z$ can also be prepared by supercritical drying in high-pressure vessels with carbon dioxide, which can be used to obtain a much higher porosity and improved mass:volume ratio. Notably both methods can be used to make inexpensive ultra-light weight $Li_xTi_yV_1B_z$ on an industrial level.

Dried $Li_xTi_yV_1B_z$ may be spongy and may have crystalline micro/nanoparticles 14 of $Li_xTi_yV_1B_z$ embedded in the material 10 around the pore spaces 12, as shown in FIG. 1. The crystalline micro/nanoparticles can glitter in presence of light. Phase contrast microscopic observation revealed that $Li_xTi_yV_1B_z$ crystals are dispersed in the mesoporous and microporous aerogel, as shown in FIG. 1. In FIG. 1, the circles or pore spaces 12 represent void spaces which can easily transport electrolyte. The electrolyte can carry all trans-membrane ions in the electrolyte quickly towards the $Li_xTi_yV_1B_z$ crystals 14.

The shape, structure and size of pores may depend on the proportion of precursor constituents, alkyl alcohol and reducing agent. As disclosed herein, these parameters may vary the values of x, y and z in the $Li_xTi_yV_1B_z$ material which may determine if the resulting material is more of an aerogel structure or a crystalline structure.

Ultra-light weight $Li_xTi_yV_1B_z$ may exhibit lithium intercalation in its structure, and may have an intrinsic 14 electron discharge capacity, 3 electrons from lithium intercalation and 11 electrons from oxidation of vanadium boride in the material. For example, the anode reactions below show a total of 14 electrons discharged from one molecule of the material.

$Li_2Ti_4VB_2+3Li \rightarrow Li_5Ti_4VB_2+3e^-$ $VB_2+11OH^- \rightarrow 0.5V_2O_5+B_2O_3+5.5H_2O+11e^-$ The vanadium boride may have an electron discharge capacity of 11 electrons per molecule. Vanadium boride may undergo an oxidation of both the vanadium (oxidation state of +4-+5), and each of the two borons (oxidation state of +2-+3), to result in an 11 electron per molecule oxidation.

Comparative advantages of the lithium titanium vanadium boride in accordance with the disclosed embodiments may include an intrinsic 11 electron discharge capacity, from oxidation of vanadium boride in the $Li_xTi_yV_1B_z$. If intercalated with lithium ions, the electron discharge capacity may be increased to 14 electrons per molecule. Lithium titanium vanadium boride as an anode material can have extremely fast discharge speed, and can have a charge potential of about 1.3V-1.6 V. The material may also have zero-strain ion insertion and hence facilitates high mobility of ions through its structure. $Li_xTi_yV_1B_z$ can accordingly have more volumetric capacity and intrinsic electron discharge capacity than vanadium boride or $Li_4Ti_5O_{12}$.

Additionally, $Li_xTi_yV_1B_z$ with micro or nano crystal particles evenly distributed (see for example FIG. 1) in the structure in accordance with the disclosed embodiments can greatly shorten ion diffusion distance and enhance vanadium boride oxidation. The rate capability and electrochemical performance of an electrode material may thus be improved.

The $Li_xTi_yV_1B_z$ can have potential applications as thermal and vibration insulators, such as shock absorbers, and catalyst supports, in addition to its applications in battery electrodes. The material may also find utility in the automobile and aerospace industries.

EXAMPLES

Example 1

Preparation of Precursor Metal Solutions

Titanium dioxide was vigorously mixed with concentrated hydrochloric acid in a 1:10 molar ratio. After five minutes of mixing, the mixture was allowed to settle for ten minutes. Ten mL of a yellowish-white supernatant was decanted and added into a fresh test tube. The supernatant contained titanium chloride and residues of titanium dioxide and hydrochloric acid. Twenty mL of isopropyl alcohol was added to the supernatant with vigorous mixing, to form Precursor solution 1 with release of heat. Precursor solution 1 contained a yellow-ish titanium isopropoxide and residual titanium oxide and titanium chloride.

Similarly Vanadium tetrachloride ($VCl_4$) was freshly prepared by vigorously mixing $V_2O_5$ and concentrated HCl in a 1:10 molar ratio. The mixture was allowed to settle for 10 minutes. The solution turned dark red in color due to formation of $VCl_4$. Ten mL of a supernatant was decanted from the mixture, added into a fresh test tube, mixed with 20 mL isopropyl alcohol with vigorous mixing, and left to settle for 10 minutes to form precursor solution 2 with release of heat. The precursor solution 2 contained vanadium isopropoxide (light orange/brown) and may also contain residual vanadium pentoxide and vanadium tetrachloride.

LiOH (0.8 M) in water ($H_2O$) was added into a test tube, and mixed with concentrated HCl(11.65 M). The LiOH reacted vigorously with HCl to release hydrogen gas. The solution contained LiCl. Ten mL of LiCl was added into to a fresh test tube, and mixed with 20 mL of isopropanol, to form colorless lithium isopropoxide with release of heat to form precursor solution 3. The precursor solution 3 may also contain residual lithium chloride.

All of the precursor solutions may not be pure, and may contain $TiO_2$ and $V_2O_5$, which can be catalytically reduced to titanium and vanadium nanoparticles and contribute to the forming of $Li_xTi_yV_1B_z$.

Example 2

Preparation of Mesoporous Lithium Titanium Vanadium Boride

Figure 4:
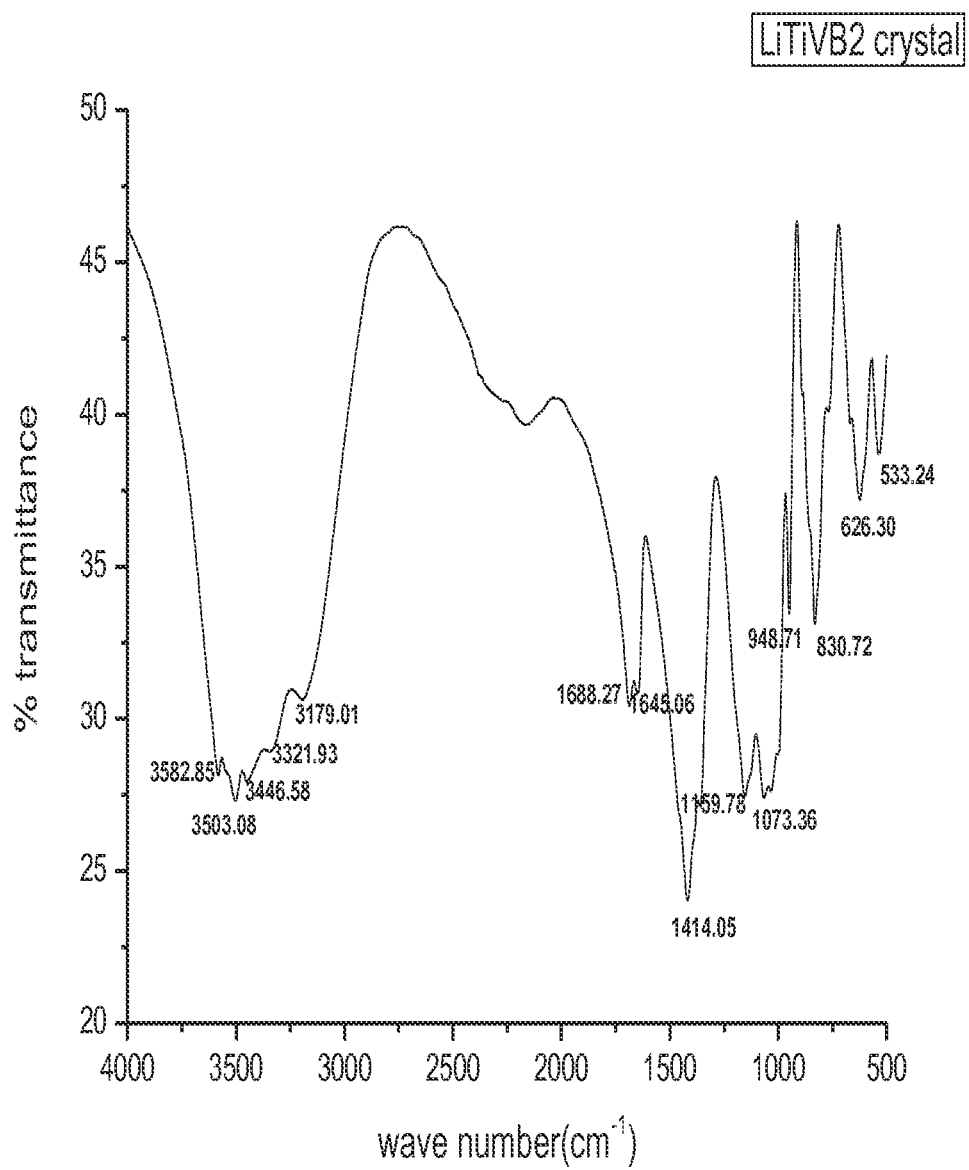
FIG. 4: High resolution x-ray diffraction of mesoporous $Li_xTi_yV_1B_z$ prepared in accordance with the disclosed embodiments.
Figure 5:
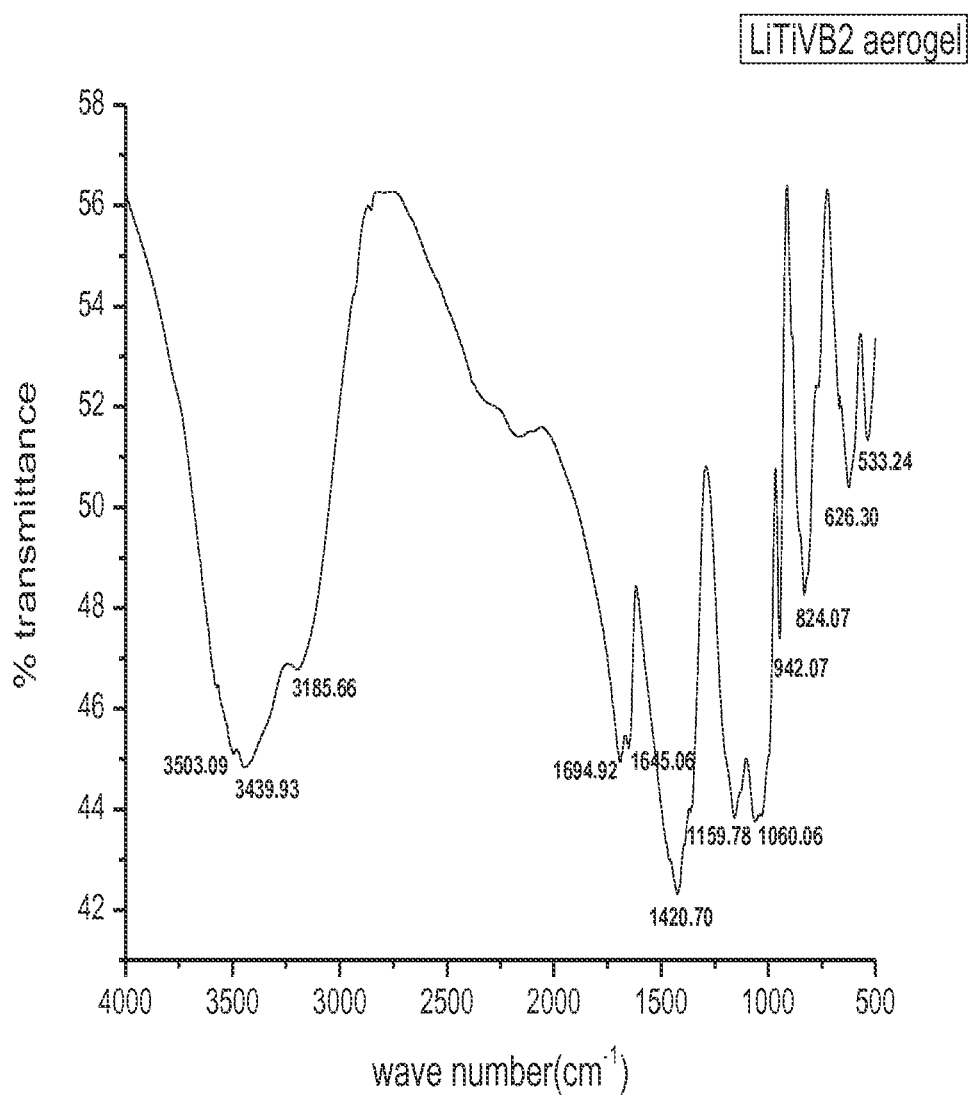
FIG. 5: Fourier transform infrared spectrum of mesoporous $Li_xTi_yV_1B_z$ prepared in accordance with the disclosed embodiments.

Twenty mL of ethanol and 10 mL of water or 30 ml of ethanol only was added into a 100 mL conical flask. The mixture was stirred with a magnetic stirrer. While stirring, 5 mL of vanadium isopropoxide (Precursor solution 2) was added to the flask. The color of the solution immediately changed sequentially from lemon yellow, to yellow, and to greenish white. 5 mL titanium isopropoxide (Precursor solution 1) was then added into the solution, followed by 5 mL lithium isopropoxide (Precursor solution 3). While constantly stirring, $NaBH_4$ (2M) was poured vigorously from a burette into the conical flask. The solution will show various color changes during the course of reduction of the entire solution by the $NaBH_4$. When reducing agent sodium borohydride (2M) was added, the solution turned greenish/greenish white. On continuous borohydride addition (2M solution, 22-25 ml) for a minute, the color turned light yellow and after a few seconds it turned deep yellow, which turned greyish/steel grey with a release of hydrogen gas within few minutes. Compounds of titanium, vanadium or lithium present in the solution were catalytically reduced to Ti, V, Li nanoparticles almost simultaneously in presence of hydrogen, and eventually reacted with boric acid in the solution to form $Li_xTi_yV_1B_z$. The solution was poured in to a test tube and allowed to stand for 48 hours. Gradually the $Li_xTi_yV_1B_z$ aerogel was formed, which floated in the solution during precipitation. The $Li_xTi_yV_1B_z$ aerogel was greyish/grey-white in color. The $Li_xTi_yV_1B_z$ aerogel was carefully washed with acetone several times, before supercritical drying. The dried ultra-light-weight $Li_xTi_yV_1B_z$ aerogel was one of greenish greyish or whitish in color with microcrystals glittering throughout the aerogel material after supercritical drying. A high resolution x-ray diffraction pattern of the aerogel is shown in FIG. 4 and a Fourier Transform Infra-Red (FTIR) pattern of the aerogel is shown in FIG. 5.

The ultra-light weight lithium titanium vanadium boride aerogel has a weight of approximately 0.2549 gram. The $Li_xTi_yV_1B_z$ aerogel material was 2.2 mL volume. Hence, the density of the aerogel was 0.1158 gram/mL. The reduced species formula was $Li_2Ti_4VB_2$.

Example 3

Preparation of Crystalline Lithium Titanium Vanadium Boride

Figure 2:
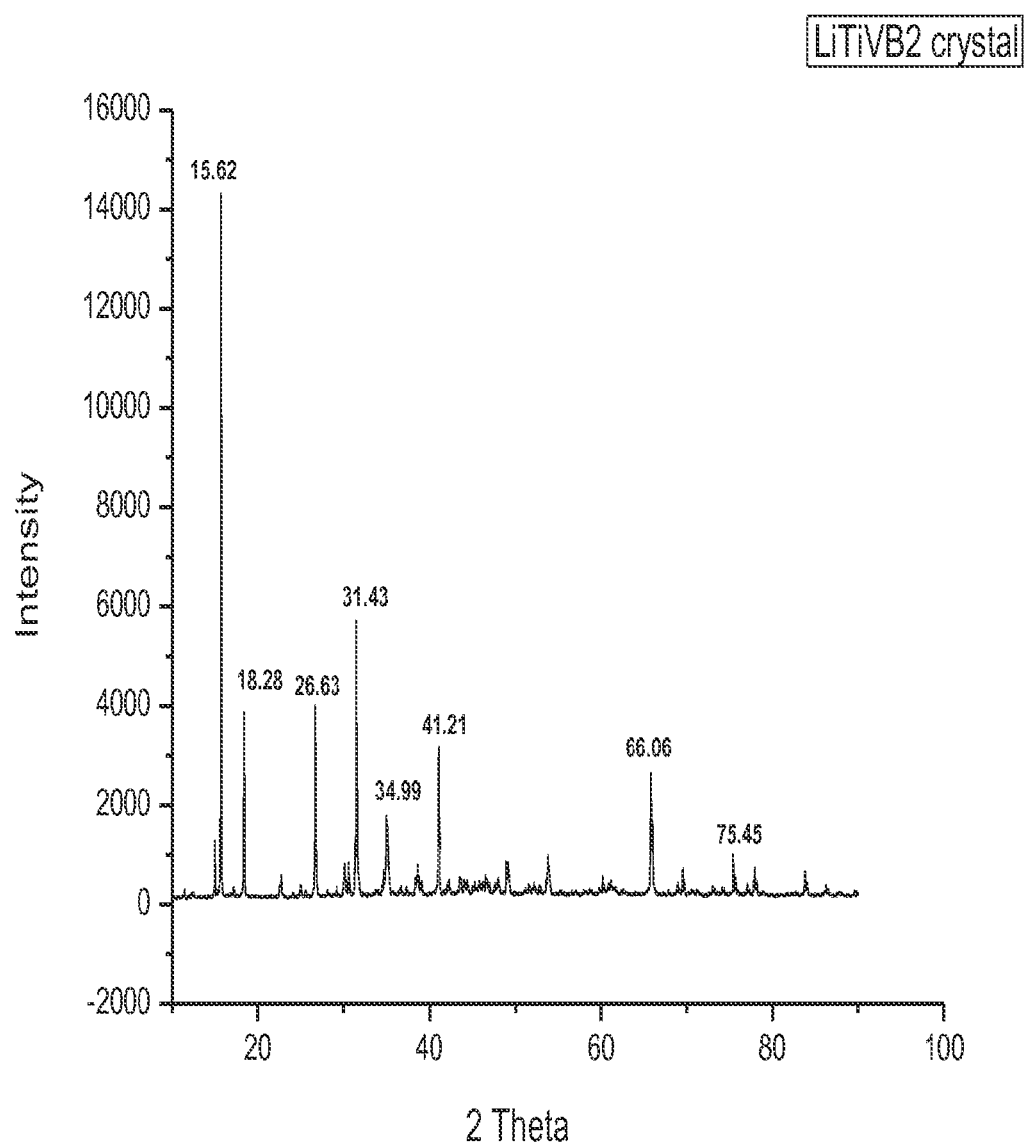
FIG. 2: High resolution x-ray diffraction of crystalline $Li_xTi_yV_1B_z$ prepared in accordance with the disclosed embodiments.
Figure 3:
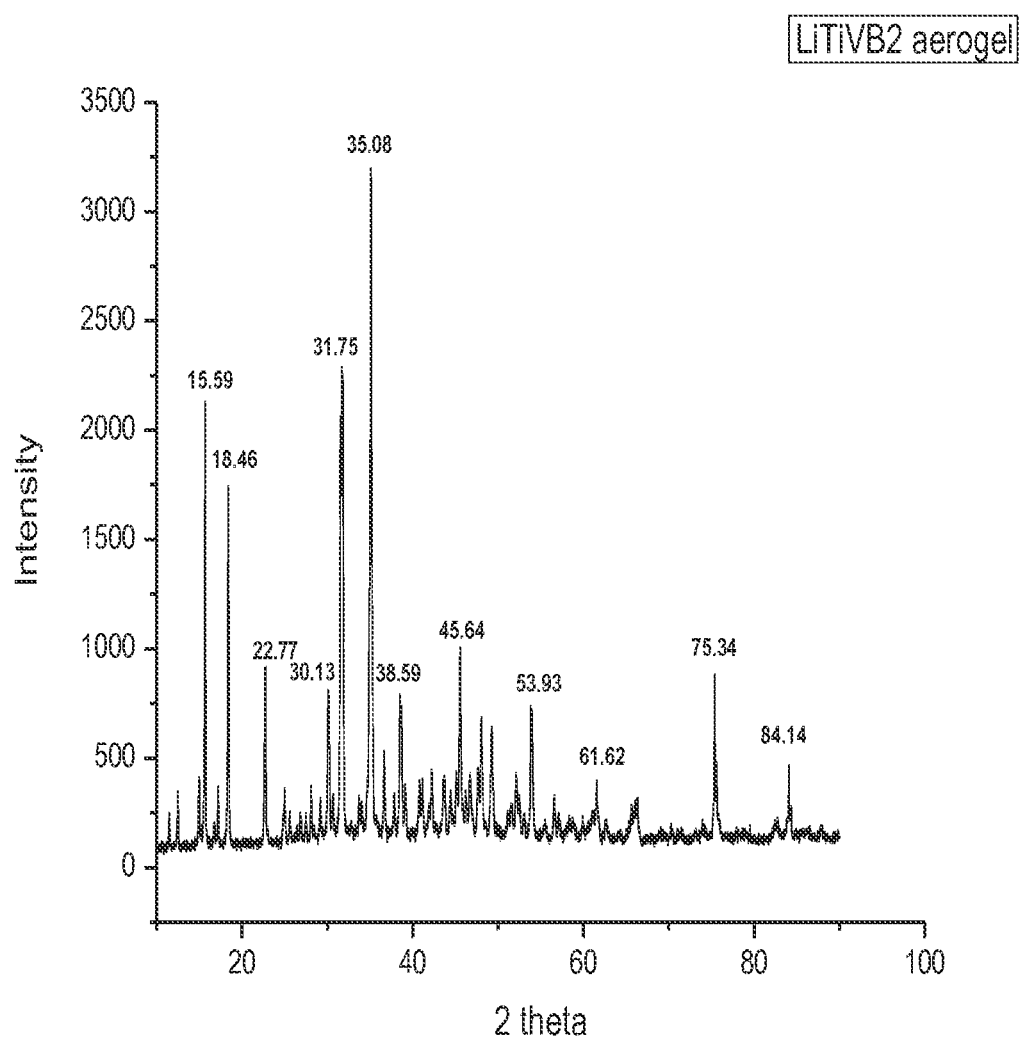
FIG. 3: Fourier transform infrared spectrum of crystalline $Li_xTi_yV_1B_z$ prepared in accordance with the disclosed embodiments.

The three precursor solutions were prepared as in Example 1 and mixed as in Example 2. While constantly stirring, $NaBH_4$ (2M) was poured vigorously from a burette, the quantity added being twice that of Example 2. The solution shows various color changes during the course of reduction of the entire solution. Compounds of titanium, vanadium or lithium present in the solution were catalytically reduced to Ti, V, Li nanoparticles almost simultaneously in the presence of hydrogen, eventually reacting with boric acid in the solution to form $Li_xTi_yV_1B_z$. The solution was poured into a test tube and was allowed to stand for 48 hours. Gradually the $Li_xTi_yV_1B_z$ crystals were formed, and were greyish/grey-white in color. The $Li_xTi_yV_1B_z$ crystals were washed with acetone several times, before drying. The crystalline material was dried in an oven. A high resolution x-ray diffraction pattern of the crystals is shown in FIG. 2 and its FT-IR pattern in FIG. 3. The dried ultra-light-weight $Li_xTi_yV_1B_z$ was greenish/grayish/whitish in color. Due to the higher amount of borohydride added as compared to Example 2, a crystalline structure of $Li_xTi_yV_1B_z$ was formed instead of an aerogel. The reduced species formula was $Li_2Ti_4VB_5$.

Example 4

Rechargeable Battery Using $Li_xTi_yV_1B_z$ Anode and Carbon Air Cathode $Li_xTi_yV_1B_z$ aerogel from Example 2 is mixed with an aqueous electrolyte, for example lithium hydroxide in water, to make a gel anolyte, which filled a first half cell of the battery. The $Li_xTi_yV_1B_z$ aerogel-air battery has two half cells which are in electrochemical contact with each other through a carbon electrolyte. Carbon with lithium hydroxide (5 M) is used in a cathode chamber (the second half cell) with the carbon electrolyte in the $Li_xTi_yV_1B_z$ aerogel-air cell. Thus the first half-cell includes a $Li_xTi_yV_1B_z$ gel anolyte and the second half-cell includes a Lithium hydroxide+carbon cathode. The cathode is made by mixing 5 M LiOH with carbon particles in water ($H_2O$) where LiOH was ionized to $Li^+ + OH^-$ in the presence of the $H_2O$. The electrons flow through an external circuit and return to the cathode, reducing oxygen in the reaction to produce hydroxide ions: $O_2 + 2H_2O + 4e^- = 11OH^-$. The $Li_xTi_yV_1B_z$ anode, separator, carbon electrolyte, and carbon air cathodes are sealed inside a battery cell. An electrical discharge of the anode is performed via lithium insertion and multiple electron oxidation of the $Li_xTi_yV_1B_z$ aerogel anode.

The battery is expected to give a 1.3 V-1.6 V continuous open circuit discharge.

$Li_4Ti_5V_1B_2 + 3Li = Li_7Ti_5V_1B_2 + 3e^-$ or $V_1B_2 + 11/4 O_2 \rightarrow B_2O_3 + \frac{1}{2}V_2O_5$ Ecell=1.55 volts (V).

Example 5

Preparation of $Li_xTi_yV_1B_z$—Air Watch Battery (1 cm Diameter)

Two conventional zinc-air button cells with 1 cm anode surface diameter were used to fabricate $Li_xTi_yV_1B_z$ aerogel-air button cells. The zinc-air button cells were carefully opened. The zinc layer was cleaned, and the carbon cathode material was removed. $Li_xTi_yV_1B_z$ crystal and aerogel were used to replace the zinc anodes in the conventional zinc-air button cells. $Li_xTi_yV_1B_z$ powdered crystal (0.1 gram) from Example 3 was placed in one of the opened cells, and $Li_xTi_yV_1B_z$ aerogel (0.1 gram) from Example 2 was placed in the other opened cell. A separator was placed over the $Li_xTi_yV_1B_z$ aerogel anode and the $Li_xTi_yV_1B_z$ crystal anode. Activated carbon slurry was prepared by mixing 5 M LiOH with activated carbon to form a cathode. The slurry was used to fill the two lids of the button cells. The lids were placed on the separator of each of the cells above the anode and sealed such that the button cells were air tight. Both cells showed a 1.45 V open circuit discharge, which continued for several days. Both the cell with the crystal anode and the cell with the aerogel anode produced a high voltage (1.45 V) in an open circuit. $Li_xTi_yV_1B_z$ aerogel showed fast, prolonged and uniform battery discharge. Both the cell having the $Li_xTi_yV_1B_z$ crystal anode and the cell having the $Li_xTi_yV_1B_z$ aerogel anode, with LiOH+carbon as the cathode in both cells, therefore exhibited high discharge potential.

Example 6

Preparation of $Li_xTi_yV_1B_z$—Air Watch Battery (2 cm Diameter)

Two CR2025 watch batteries were used to fabricate the $Li_xTi_yV_1B_z$-air cells. Cells were opened carefully, and the lithium layer was cleaned to remove all previous anode materials. Carbon cathode material was removed. $Li_xTi_yV_1B_z$ crystal (0.5 gram) was placed in one opened cell, and $Li_xTi_yV_1B_z$ aerogel (0.5 gram) was placed in the other opened cell. A separator was placed over the $Li_xTi_yV_1B_z$ crystal anode and the aerogel anode. Activated carbon slurry was prepared by mixing 5 M LiOH with activated carbon to form a cathode. The slurry was used to fill the two lids of the button cells. Each of the lids was placed on the separator above the anode, and sealed such that both cells were air tight. The cells gave a 1.4 V continuous open circuit discharge.

Example 7

Preparation of $Li_xTi_yV_1B_z$—Air Coin Cell (5 cm Diameter) Battery 2.0 g of $Li_xTi_yV_1B_z$ crystal powder and the same amount of the aerogel were used as an anode in two $Li_xTi_yV_1B_z$-air coin batteries. The crystal powder was placed in one plastic box and the aerogel was placed in the other plastic box. Both plastic boxes have diameters of about 5 cm and have lids. A separator was carefully removed from a Li ion mobile battery after dismantling. The separator was cut in to a size and shape to fit in the plastic box. The separator was placed over the $Li_xTi_yV_1B_z$ anode in both plastic boxes. The cathode was prepared by mixing activated carbon with 5 M KOH to form a slurry and the slurry was used to fill each of the lids. The lids were placed above the separators in both boxes above the anode side and sealed to make them air tight as far as possible to form the cells. Metal electrodes were inserted into both cells followed by heating the metals after filling the cells with the cathode and anode materials, but before closing the lid. After a few minutes, the batteries gave a 1.3V-1.6V continuous open circuit discharge.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

While various compositions, methods and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a", "an", or "the" limits any particular claim containing such introduced claim recitation to embodiments containing only one such recitation, even when the same claim includes the introductory phrases "one or more" or "at least one" and indefinite articles such as "a", "an", or "the" (for example, "a" and/or "an" and/or "the" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations,"

without other modifiers, means at least two recitations, or two or more recitations). Furthermore, in those instances where a convention analogous to "at least one of A, B, and C, and the like." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like." is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group. As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, and the like. As a non-limiting example, each range discussed herein can be readily broken down into a lower third, middle third and upper third, and the like. As will also be understood by one skilled in the art all language such as "up to," "at least," and the like include the number recited and refer to ranges that can be subsequently broken down into subranges as discussed above. Finally, as will be understood by one skilled in the art, a range includes each individual member. Thus, for example, a group having 1-3 substituents refers to groups having 1, 2, or 3 substituents. Similarly, a group having 1-5 substituents refers to groups having 1, 2, 3, 4, or 5 substituents, and so forth.

What is claimed is:

1. A composition comprising a material having a formula of $Li_xTi_yV_1B_z$, wherein x, y, and z are real numbers greater than 0.

2. The composition of claim 1, wherein x is not greater than 7.

3. The composition of claim 1, wherein y is not greater than 6.

4. The composition of claim 1, wherein z is less than or equal to 10.

5. The composition of claim 1, wherein the composition is a microporous aerogel, a mesoporous aerogel, a crystalline structure, or a combination thereof.

6. The composition of claim 1, wherein the composition is an aerogel selected from a microporous aerogel, a mesoporous aerogel, and a combination thereof, and a surface of the aerogel comprises microcrystals, nanocrystals, or a combination thereof, of the material.

7. The composition of claim 1, wherein the composition is made into a film.

8. The composition of claim 1, wherein the composition is deposited as a layer onto the anode of an energy storage device.

9. The composition of claim 1, wherein the composition has characteristics of sponginess.

10. The composition of claim 1, wherein the composition has a density of about 0.05 gram/mL to about 1 gram/mL on a dried basis.

11. The composition of claim 1, wherein one or more of Li, Ti, V, and B, is in an oxidized state.

12. A method of producing a composition having a formula of $Li_xTi_yV_1B_z$, wherein x, y, and z are real numbers greater than 0, the method comprising:
contacting an aqueous solution of a vanadium entity, a titanium entity, and a lithium entity, with a borohydride to form an aqueous mixture of nanoparticles;
forming a gel out of the aqueous mixture of nanoparticles;
isolating the gel; and
drying the gel to form the composition.

13. The method of claim 12, wherein contacting the aqueous solution of the vanadium entity comprises contacting at least one of the vanadium entity comprising a vanadium alcoholate, a vanadium halide, a vanadium oxide, vanadium isopropoxide, vanadium tetrachloride, vanadium pentoxide or a combination thereof.

14. The method of claim 12, further comprising:
contacting a vanadium oxide with concentrated hydrochloric acid to form a vanadium chloride; and
adding a first alkyl alcohol to the vanadium chloride to form the vanadium entity.

15. The method of claim 14, comprises adding methanol, ethanol, isopropanol, n-propanol, a butanol, or a combination thereof.

16. The method of claim 12, comprises contacting a titanium alcoholate, titanium halide, a titanium oxide, titanium isopropoxide, titanium chloride, titanium oxide, or a combination thereof.

17. The method of claim 12, further comprising:
contacting a titanium oxide with concentrated hydrochloric acid to form a titanium chloride; and
adding a second alkyl alcohol to the titanium chloride to form the titanium entity.

18. The method of claim 17, comprises adding methanol, ethanol, isopropanol, n-propanol, a butanol, or a combination thereof.

19. The method of claim 12, comprises contacting a lithium alcoholate, lithium halide, lithium hydroxide, lithium isopropoxide, lithium chloride, lithium hydroxide or a combination thereof.

20. The method of claim 12, further comprising:
contacting lithium hydroxide with concentrated hydrochloric acid to form a lithium chloride; and
adding a third alkyl alcohol to the lithium chloride to form the lithium entity.

21. The method of claim 20, comprises contacting methanol, ethanol, isopropanol, n-propanol, a butanol, or a combination thereof.

22. The method of claim 12, contacting the aqueous solution with the borohydride comprises contacting with at least one borohydride comprising sodium borohydride and lithium borohydride.

23. The method of claim 12, further comprising preparing the aqueous solution by:
contacting lithium hydroxide with an excess of hydrochloric acid to form a lithium chloride, and adding a first alcohol to the lithium chloride to form the lithium entity;
contacting titanium dioxide with an excess of hydrochloric acid to form a titanium chloride, and adding a second alcohol to the titanium chloride to form the titanium entity;
contacting vanadium pentoxide with an excess of hydrochloric acid to form a vanadium tetrachloride, and adding a third alcohol to the vanadium tetrachloride to form the vanadium entity; and
mixing the lithium entity, the titanium entity, and the vanadium entity to form the aqueous solution.

24. An energy storage device, comprising:
a first half cell comprising:
an anode in contact with an anolyte, wherein the anode comprises a layer in contact with the anolyte, the layer comprising a formula of $Li_xTi_yV_1B_z$, wherein x, y, and z are real numbers greater than 0; and
a second half cell comprising:
a cathode in contact with a catholyte;
wherein the first half cell is in electrochemical contact with the second half cell, the first half cell separated from the second half cell by a separator.

25. The device of claim 24, wherein the device is a battery.

26. The battery of claim 25, wherein the layer is a mesoporous aerogel, a microporous aerogel, or a combination thereof.

27. The battery of claim 25, wherein x is greater than 0 and not greater than 7.

28. The battery of claim 25, wherein y is greater than 0 and not greater than 6.

29. The battery of claim 25, wherein z is greater than 0 and not greater than 5.

30. The battery of claim 25, wherein the anolyte is a solid or a fluid.

* * * * *

UNITED STATES PATENT AND TRADEMARK OFFICE
CERTIFICATE OF CORRECTION

PATENT NO.        : 9,577,260 B2                                Page 1 of 1
APPLICATION NO.   : 14/309554
DATED             : February 21, 2017
INVENTOR(S)       : Deb It is certified that error appears in the above-identified patent and that said Letters Patent is hereby corrected as shown below:

In the Specification

Column 1, Line 8, delete "§119(a)" and insert -- "§ 119(a) --, therefor.

Column 1, Line 9, delete "filed" and insert -- filed on --, therefor.

In the Claims

Column 19, Line 52, Claim 1, delete "LiV 1Bz," and insert -- LiV1Bz, --, therefor.

Signed and Sealed this
Second Day of May, 2017

Michelle K. Lee
*Director of the United States Patent and Trademark Office*